US012620660B2

(12) United States Patent
Liu et al.

(10) Patent No.: US 12,620,660 B2
(45) Date of Patent: May 5, 2026

(54) BATTERY ASSEMBLY, CERAMIFIABLE COMPOSITION, AND METHOD OF MAKING THE SAME

(71) Applicant: 3M INNOVATIVE PROPERTIES COMPANY, St. Paul, MN (US)

(72) Inventors: Junkang Jacob Liu, Woodbury, MN (US); Pingfan Wu, Woodbury, MN (US); Jose Maria Benito, Madrid (ES); Walter R. Romanko, Austin, TX (US); Lianzhou Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 667 days.

(21) Appl. No.: 18/118,908

(22) Filed: Mar. 8, 2023

(65) Prior Publication Data

US 2023/0369694 A1 Nov. 16, 2023

Related U.S. Application Data

(60) Provisional application No. 63/341,273, filed on May 12, 2022.

(51) Int. Cl.
H01M 50/204 (2021.01)
C09J 7/38 (2018.01)
(Continued)

(52) U.S. Cl.
CPC ............. H01M 50/204 (2021.01); C09J 7/38 (2018.01); C09J 183/04 (2013.01);
(Continued)

(58) Field of Classification Search
CPC ............. H01M 50/204; H01M 50/461; H01M 50/505; H01M 50/446; H01M 50/434;
(Continued)

(56) References Cited

U.S. PATENT DOCUMENTS

| | | | |
|---|---|---|---|
| 6,084,002 A | 7/2000 | Nicholson et al. | |
| 8,541,126 B2 | 9/2013 | Hermann et al. | |

(Continued)

FOREIGN PATENT DOCUMENTS

| | | |
|---|---|---|
| CN | 102618040 B | 10/2013 |
| CN | 106349711 A | 1/2017 |

(Continued)

OTHER PUBLICATIONS

Zhao; Ceramifiable Silicone Rubber Composites with Enhanced Self-Supporting and Ceramifiable Properties, Polymers 2022, 14, 1944 (Year: 2022).*

(Continued)

*Primary Examiner* — Matthew J Merkling
(74) *Attorney, Agent, or Firm* — Carolyn A. Fischer

(57) ABSTRACT

A battery assembly comprises an assembly housing, a plurality of battery modules disposed within the assembly housing and electrically coupled to a busbar, and at least one ceramifiable pad disposed within the assembly housing. Each battery module comprises a plurality of individual cells disposed within a module housing. The at least one ceramifiable pad is disposed between at least one of: at least two of the individual cells, at least two of the battery modules, the busbar and the assembly housing, or at least one of the battery modules and the assembly housing. The ceramifiable pad comprises a ceramifiable composition. Heating the ceramifiable composition to a temperature between 600 and 1600° C., inclusive, results in a ceramified composition. Ceramifiable compositions and methods of making them are also disclosed.

19 Claims, 4 Drawing Sheets

(51) Int. Cl.

| | |
|---|---|
| *C09J 183/04* | (2006.01) |
| *H01M 50/434* | (2021.01) |
| *H01M 50/446* | (2021.01) |
| *H01M 50/46* | (2021.01) |
| *H01M 50/505* | (2021.01) |

(52) U.S. Cl.
CPC ....... *H01M 50/434* (2021.01); *H01M 50/446* (2021.01); *H01M 50/461* (2021.01); *H01M 50/505* (2021.01); *C09J 2203/33* (2013.01); *C09J 2301/302* (2020.08)

(58) Field of Classification Search
CPC ...... C09J 7/38; C09J 183/04; C09J 2301/302; C09J 2203/33
See application file for complete search history.

(56) References Cited

U.S. PATENT DOCUMENTS

| | | | |
|---|---|---|---|
| 9,160,038 | B2 | 10/2015 | Buck et al. |
| 9,359,529 | B2 | 6/2016 | Liu et al. |
| 9,536,635 | B2 | 1/2017 | Polasky |
| 9,676,941 | B2 | 6/2017 | Van Eibergen et al. |
| 10,236,098 | B1 | 3/2019 | Li et al. |
| 10,501,597 | B2 | 12/2019 | O'Neil et al. |
| 10,857,758 | B2 | 12/2020 | Doi et al. |
| 2006/0004169 | A1 | 1/2006 | Sherwood, Jr. et al. |
| 2018/0057652 | A1 | 3/2018 | Irie |
| 2018/0277811 | A1* | 9/2018 | Liu ............ H01M 50/403 |
| 2019/0218425 | A1 | 7/2019 | Schwartz et al. |
| 2020/0062920 | A1 | 2/2020 | O'Neil et al. |
| 2021/0218094 | A1* | 7/2021 | Grenier ............ H01M 50/24 |
| 2021/0257690 | A1* | 8/2021 | Kilhenny ............ B32B 25/04 |
| 2021/0284841 | A1 | 9/2021 | Zhang et al. |

FOREIGN PATENT DOCUMENTS

| | | | | |
|---|---|---|---|---|
| CN | 110641101 | A | 1/2020 | |
| GB | 2360780 | A * | 10/2001 | ............ C08L 83/04 |
| WO | 2019230179 | A1 | 12/2019 | |
| WO | 2021035460 | A1 | 3/2021 | |
| WO | 2021144758 | A1 | 7/2021 | |
| WO | 2021163826 | A1 | 8/2021 | |
| WO | 2021163827 | A1 | 8/2021 | |
| WO | 2021176372 | A1 | 9/2021 | |
| WO | 2022023902 | A1 | 2/2022 | |
| WO | 2022023903 | A1 | 2/2022 | |
| WO | 2022023908 | A1 | 2/2022 | |
| WO | 2022069968 | A1 | 4/2022 | |
| WO | 2022133780 | A1 | 6/2022 | |
| WO | 2022133783 | A1 | 6/2022 | |
| WO | 2022146867 | A1 | 7/2022 | |

OTHER PUBLICATIONS

Guo; "Improving the Mechanical and Electrical Properties of Ceramizable Silicone Rubber/Halloysite Composites and Their Ceramic Residues by Incorporation of Different Borates", Polymers 2018, 10, 388 (Year: 2018).*

Andrianov, "The Hydride Addition of Organohydrosiloxanes to Compounds with a Multiple Carbon-Carbon Bond", Russian Chemical Reviews, 1979, vol. 48, No. 7, (Translated from UspekhiKhimii, 48, 1233-1255, 1979), pp. 657-668.

Anyszka, "Effect of mineral filler additives on flammability, processing and use of silicone-based ceramifiable composites", Polymer Bulletin, 2018, vol. 75, pp. 1731-1751.

Dar; "Thermally Activated Pressure-Sensitive Adhesives", Journal of Adhesion Science And Technology, 2007, vol. 21, No. 16, pp. 1645-1658.

Gong, "Improved self-supporting property of ceramifying silicone rubber composites by forming crystalline phase at high temperatures", Journal of Alloys and Compounds, Jun. 2017, vol. 706, pp. 322-329.

Li, "Polymer-Based Ceramifiable Composites For Flame Retardant Applications: A Review", Composites Communications, 2020, vol. 21, pp. 1-18.

Lou, "Preparation and properties of ceramifiable flame-retarded silicone rubber composites", Journal of Thermal Analysis and Calorimetry, May 2017, vol. 130, pp. 813-821.

Palsule, "Gamma Irradiation of Silicones", Journal Of Inorganic Organomet Polymer, 2008, vol. 18, pp. 207-221.

S. C. Shit, "A Review on Silicone Rubber", National Academy of Science Letters, Aug. 2013, vol. 36, No. 4, pp. 355-365.

Song, "Thermal Decomposition and Ceramifying Process of Ceramifiable Silicone Rubber Composite with Hydrated Zinc Borate", Materials, 2019, Vo. 12, 1591, 15 pages.

Technical Paper: "Silicone Material Solutions for Battery Fire Protection", The Dow Chemical Company, 2021, 7 pages.

* cited by examiner

BATTERY ASSEMBLY, CERAMIFIABLE COMPOSITION, AND METHOD OF MAKING THE SAME

CROSS REFERENCE TO RELATED APPLICATIONS

This application claims priority from U.S. Provisional Application Ser. No. 63/341,273, filed May 12, 2022, the disclosure of which is incorporated by reference in its/their entirety herein.

BACKGROUND

With the benefits of reduced emissions and fuel cost savings, electric vehicle drivetrains are rapidly displacing traditional internal combustion engines in the transportation sector. As these technologies are developed and scaled up, use of rechargeable batteries to power these drivetrains has greatly expanded, with some battery assemblies containing thousands of individual cells. The evolution of this technology has raised technical challenges around managing risks associated with these high voltage and high current devices in automotive vehicles.

Battery assemblies are generally governed by a battery management system that ensures that a battery is working within a specified nominal range of operating and environmental factors, including charge and discharge currents, cell voltage, and temperature. Common battery assemblies operate best in a relatively narrow operating range for temperature, generally in the range of from about 15° C. to about 45° C. Outside of this range, the operation efficiency, functional safety, service life, and cycle stability of the battery assembly can be compromised. If the temperature exceeds a critical level, thermal runaway may occur. Thermal runaway typically occurs as a result of a chain reaction in individual cell(s), where temperatures exceeding 600° C. can lead to decomposition of battery components, gas formation, ignition of the cell(s), and flame propagation to neighboring cells. Such thermal runaway (which may include fire) can quickly spread across many cells in the battery assembly if built inappropriately.

One of the primary causes of thermal runaway is an internal short circuit within the battery assembly. Short circuits can occur as a result of separators within the battery wearing out, melting, or damaging to the battery. To avoid this, battery assemblies contain many layers of insulation within the housing of the battery to electrically isolate electrical conductors within the battery from inadvertently contacting each other or the outside casing of the battery assembly, which is commonly made from metal. These materials also help avoid low current leakage which can induce undesirable self-discharge in the battery.

Battery assemblies also include battery packaging materials securing individual cells in place, preventing individual cells from mechanical abuse caused by vibration, minor impacts, or battery expansion during charge and discharge.

SUMMARY

It would be desirable to have new materials that can function as a cushioning/damping packaging material under normal operating conditions and also as a thermal/flame barrier isolating affected cells if a thermal runaway event occurs. Advantageously, the present disclosure provides such materials in the embodiment of flexible ceramifiable materials that serve as a flexible electrical and/or thermal insulators and resilient cushioning material that may be placed under the lid, on the bottom, between modules in a battery, or even between neighboring cells in a battery.

The flexible silicone-based ceramifiable compositions described herein may provide high electric resistance and high dielectric breakdown voltage at normal battery operating temperatures, but also can be converted to ceramic if subjected to extreme thermal conditions (e.g., thermal runaway), which provides excellent thermal/fire barrier protection within a battery assembly. As a further advantage, these polymeric materials can be made resiliently compressible and conformable to fill complex and irregular enclosures within a battery assembly. Overall, these beneficial properties can enable these materials to be easily installed as a resilient cushion thermal barrier isolator to mitigate the problem of battery fires and provide one way to further improve power/energy density.

In a first aspect, the present disclosure provides a battery assembly comprising: an assembly housing;

a plurality of battery modules disposed within the assembly housing and electrically coupled to a busbar wherein each battery module respectively comprises a plurality of individual cells disposed within a module housing; and at least one ceramifiable pad disposed within the assembly housing and disposed between at least one of:
at least two of the individual cells,
at least two of the battery modules,
the busbar and the assembly housing, or
at least one of the battery modules and the assembly housing, wherein the ceramifiable pad comprises a ceramifiable composition, and wherein heating the ceramifiable composition to a temperature between 600 and 1600° C., inclusive, results in a ceramified composition.

In some embodiments, the ceramifiable composition comprises a crosslinked silicone matrix comprising silicone polymers with number average molecular weight (Mn) higher than 3000 grams/mole and stabilizing components higher than 50 percent by weight of total ceramifiable composition.

In some embodiments, the ceramifiable composition comprises a crosslinked silicone matrix comprising stabilizing components, wherein the stabilizing components comprise subcomponents:

a) an aluminosilicate clay;

b) at least one of phosphorus pentoxide, a polyphosphate, an inorganic phosphate salt, boron oxide, a hydrate thereof, a salt thereof, an organotitanate compound, or an organotin compound; and c) comprises at least one of alumina or an at least partially hydrated form thereof, calcium oxide or an at least partially hydrated form thereof, calcium carbonate, magnesium oxide or an at least partially hydrated form thereof, magnesium carbonate, or iron oxide or an at least partially hydrated form thereof.

In some embodiments, the ceramified composition comprises crystalline and self-supporting ceramic structures comprising hollow tube/channel structures.

In a second aspect, the present disclosure provides a method of making a ceramifiable composition, the method comprising:

providing a ceramifiable composition comprising at least a crosslinkable silicone and stabilizing components, wherein the stabilizing components comprise subcomponents:

a) an aluminosilicate clay;

b) at least one of phosphorus pentoxide, a polyphosphate, an inorganic phosphate salt, boron oxide, a hydrate thereof, a salt thereof, an organotitanate compound, or an organotin compound;

c) comprises at least one of alumina or an at least partially hydrated form thereof, calcium oxide or an at least partially hydrated form thereof, calcium carbonate, magnesium oxide or an at least partially hydrated form thereof, magnesium carbonate, or iron oxide or an at least partially hydrated form thereof;

extruding the mixture; and exposing the mixture to high energy radiation to provide a ceramifiable composition comprising a crosslinked silicone matrix retaining the stabilizing components.

In a third aspect, the present disclosure provides a ceramifiable composition made according to the preceding method.

As used herein:

The term "ceramic" refers to a natural or synthetic inorganic, non-metallic, polycrystalline material. Ceramic materials are characterized by relatively high hardness, high melting point, low thermal expansion, good chemical resistance, and a brittleness which can lead to fractures unless the material is toughened by reinforcing agents or by other means. The ionic and covalent bonds of ceramics are responsible for many unique properties of these materials, such as high hardness, high melting points, low thermal expansion, and good chemical resistance, but also for some undesirable characteristics, foremost being brittleness.

The term "ceramifiable" means capable of being thermally converted (i.e., by heating) into a ceramified material, The term "ceramified" refers to a material comprising at least 40 percent by weight (in some embodiments, at least 50 percent by weight, at least 60 percent by weight, at least 70 percent by weight, at least 80 percent by weight, at least 90 percent by weight, at least 99 percent by weight, or even 100 percent by weight) of ceramic crystals (i.e., ceramic crystalline phase), but which may or may not be a monolithic material. For example, in some instances ceramified material may be composed of ceramic particles and/or fibers.

The term "pad" refers to a substantially two-dimensional (i.e., having a thickness much less than the length or width) layer of material.

The term "ASTM" refers to ASTM International, West Conshohocken, Pennsylvania.

Features and advantages of the present disclosure will be further understood upon consideration of the detailed description as well as the appended claims.

Figure 1:
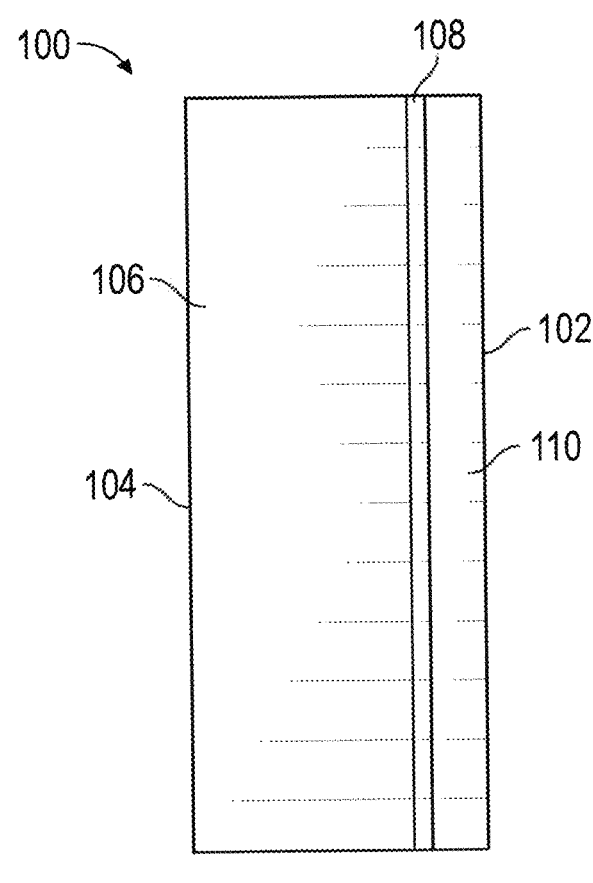
FIG. 1 is an elevational cross-sectional view of a subassembly for installation into a battery assembly according to an exemplary embodiment.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

A generalized subassembly for incorporation into the battery assembly is shown in FIG. 1. As shown, subassembly 100 has a multi-layered construction with opposed first and second major surfaces (102, 104) and an inward-facing major surface 104. The layers of the subassembly 100 include a ceramifiable pad 106 exposed at the inward-facing major surface 104, an optional adhesive layer 108, and an optional plate 110 that is exposed at the outward-facing major surface 102.

Optionally and as shown, the ceramifiable pad 106, optional adhesive layer 108, and optional plate 110 directly contact each other as shown in FIG. 1. Alternatively, one or more additional layers, such as primers, tie layers, scrims, or other functional layers, may be disposed between adjacent layers of the subassembly 100 or on either major surface 102, 104 of the subassembly or any of its constituent layers. While the subassembly 100 is shown having a generally rectilinear shape in this figure, it is to be understood that it could include bends and/or curved contours based on the shape of the battery assembly.

The optional adhesive layer 108 need not be particularly limited but preferably has flame-retardant properties. Suitable adhesives can include heat-activated adhesives containing polyurethanes or acrylates. In some embodiments, the adhesive is stimuli-responsive. For example, the adhesive layer 108 can be initially non-tacky, enabling it to be stored unprotected by a release liner, but become tacky upon activation by heat. Exemplary materials are described in Y. L. Dar, W. Yuan-Huffman, S. Shah, and A. Xiao, *Journal of Adhesion Science and Technology* (2007), 21, pp. 1645-1658. Adhesive compositions can also be blended with flame retardant agents such as bromine, phosphate, and iodine salts. Optionally, the adhesive is a pressure-sensitive adhesive.

Pressure-sensitive adhesives (PSAs) are well known and widely available. Examples include acrylic PSAs and silicone PSAs. Suitable releasable liners for pressure-sensitive adhesives, which typically vary depending on the composition of the PSA, may include, for example, silicone-treated papers and films and fluorosilicone-treated papers or films.

Plate 110 can be, in some embodiments, part of a battery assembly housing. Plate 110 is commonly made from a rigid metal such as a nickel-plated steel, stainless steel, or aluminum. The purpose of plate 110 is to provide mechanical strength to the battery subassembly 100 and help prevent punctures or leakage in the event the battery assembly is damaged in a collision or other external factor.

Figure 2:
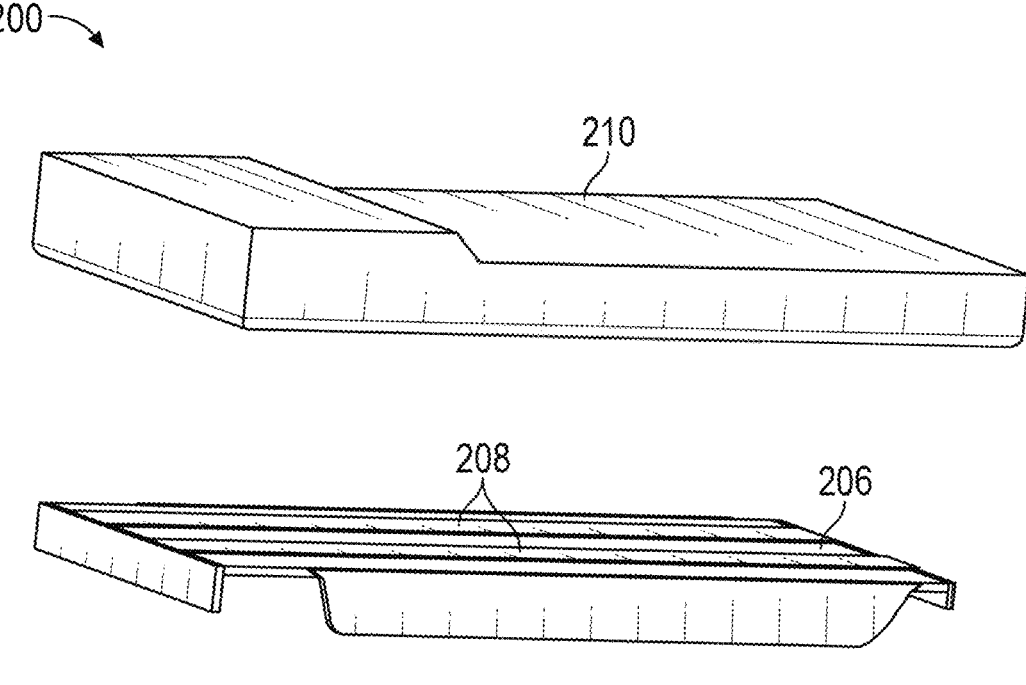
FIG. 2-4 are perspective views of battery subassemblies according to various embodiments, with FIGS. 2 and 4 shown in exploded view.

FIG. 2 shows a subassembly 200 formed into a more complex configuration. Here, the subassembly 200 includes a lid 210 having five orthogonal walls as shown that collectively define a bottom-facing cavity (not visible in FIG. 2). Assuming a shape that conforms with the cavity is a ceramifiable pad 206 and two elongated strips of adhesive layer 208. The strips of adhesive layer 208 bond the ceramifiable pad 206 and the lid 210 to each other.

Figure 3:
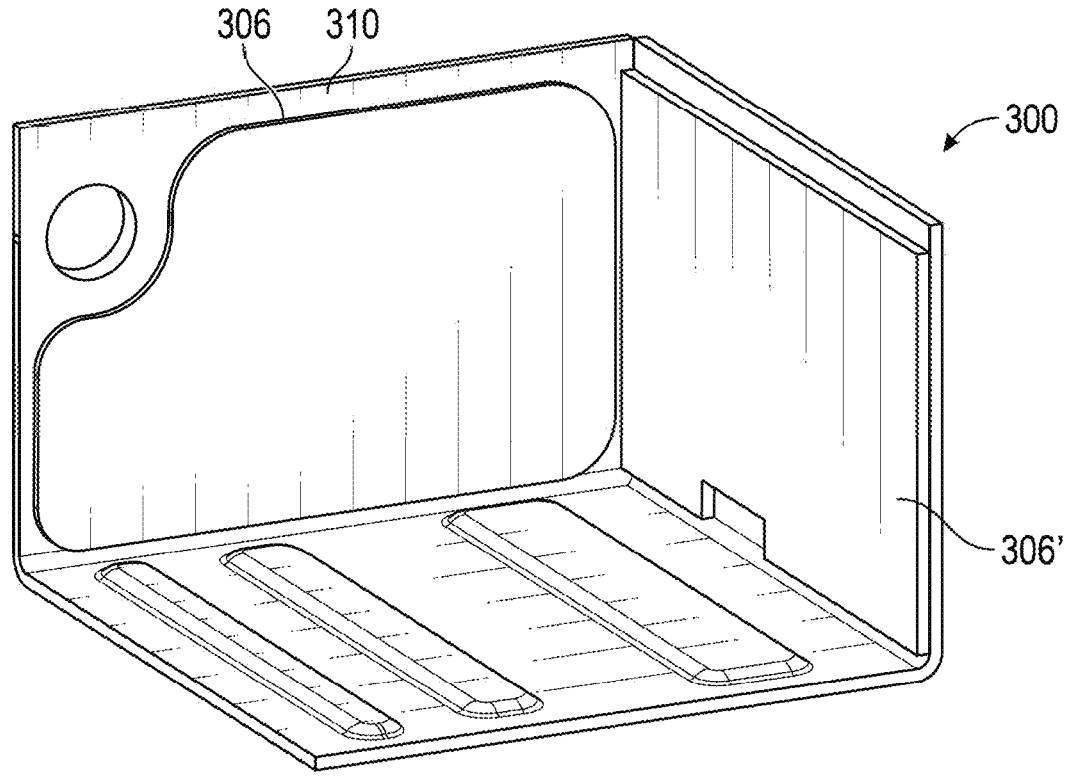

FIG. 3 shows a subassembly 300 according to an alternative configuration, in which a plate 310 includes three orthogonal walls and two distinct ceramifiable pads 306, 306' are coupled to the walls of the plate 310. In this embodiment, the ceramifiable pads 306, 306' can be adhesively bonded to the plate 310 or attached using mechanical joints, such as using one or more clips, hooks, fasteners, or even just an interference fit provided by neighboring subassembly structures. Optionally, one or more openings could be present in the ceramifiable pad 306 to accommodate a mechanical joint to be disposed on the plate 310.

Figure 4:
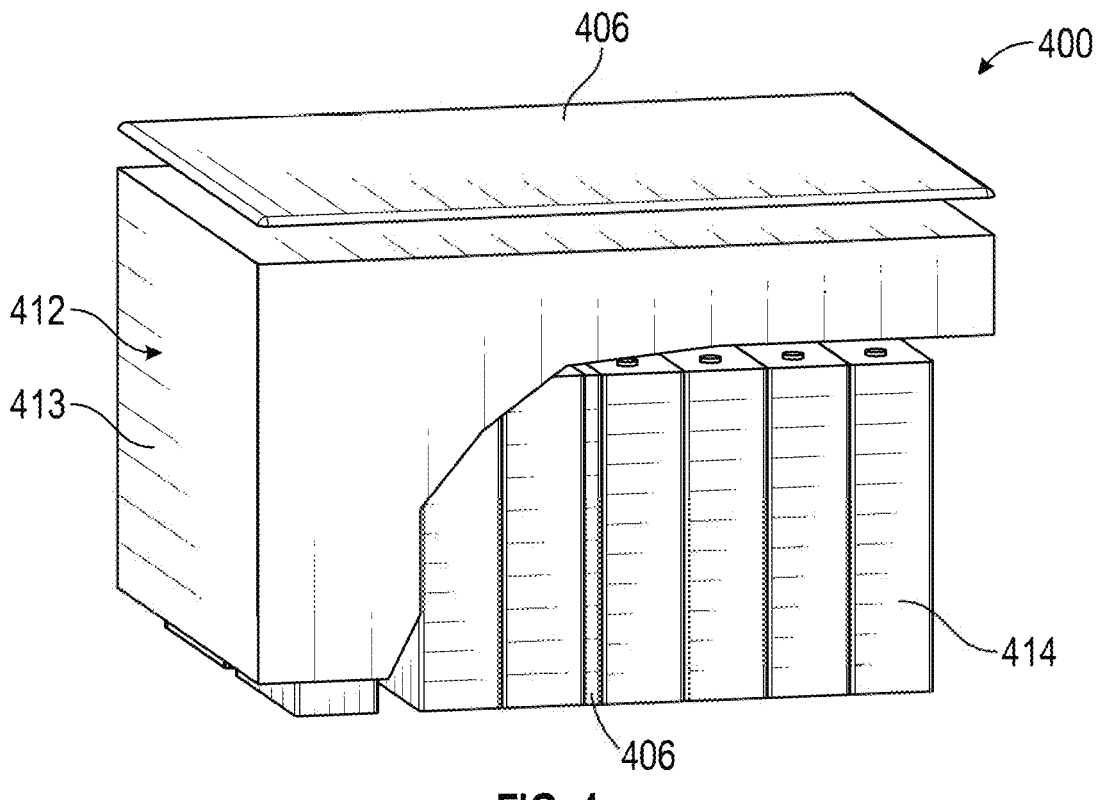

FIG. 4 is a fragmentary view showing a battery subassembly 400 within a battery assembly including a battery module 412 that includes a module housing 413 that at least partially encloses a plurality of individual cells 414. In some instances, the module housing 413 is metallic and can be electrically-conductive. The materials used to construct the module housing 413 need not be limited, and can include aluminum, steel, or a polymer composite, depending on performance and weight requirements. Located above the battery module 412 is a ceramifiable pad 406 bonded to the module housing 413 by an interposing adhesive layer (not visible in the figure).

Figure 5:
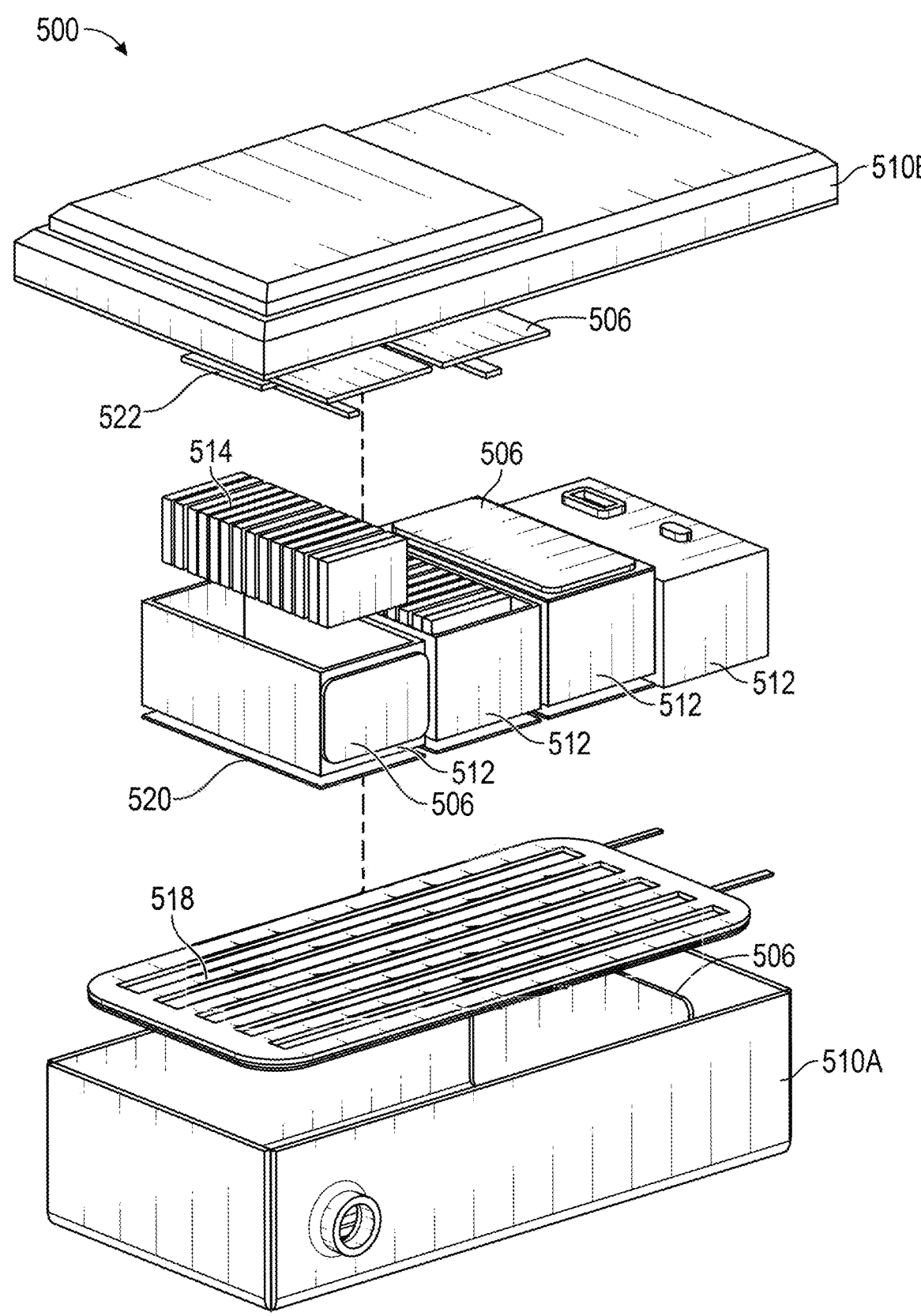
FIG. 5 is an exploded perspective view of a battery assembly according to an exemplary embodiment.

FIG. 5 shows a comprehensive battery assembly 500 in which ceramifiable pad(s) according to the present disclosure can be advantageously deployed. The assembly 500, shown in exploded view, incorporates components bearing many structural similarities to the battery subassemblies 100, 200, 300, 400 previously shown and described. In FIG. 5, the battery assembly 500 includes an assembly housing collectively provided by mating components battery case 510A and battery lid 510B. Received therein are battery modules 512, each containing a plurality of individual cells 514 (i.e., battery cells) similar to those shown previously in FIG. 4. In the embodiment shown, four battery modules 512 are shown, although this number is merely exemplary.

Further, it is contemplated that one or more ceramifiable pads 406 according to the present disclosure can be interposed between adjacent individual cells 514 as shown, for example, in FIG. 4.

Residing on the inner bottom surface of the case 510A beneath the battery modules 512 is a cooling plate 518, which is typically made from a highly thermally-conductive metal such as steel or aluminum, and a conformable thermal pad 520 to conduct heat from the battery modules 512 to the cooling plate 518.

Extending along the top surfaces of the battery modules 512 is a busbar 522, a strip of metal that is electrically coupled to one or more battery modules 512 within the battery assembly 500. The busbar 522 conducts an electric current and provides power distribution within the battery assembly 500. In exemplary embodiments, the busbar 522 itself is not electrically insulated. Throughout the battery assembly 500 in the space enclosed by the case 510A and lid 510B are ceramifiable pads 506, each including at least one ceramifiable pad and optionally an adhesive layer disposed thereon, as used in the subassembly 100 of FIG. 1.

Referring again to FIG. 5, the ceramifiable pad 506 is disposed between the busbar 522 and assembly housing to electrically insulate these components from each other. Generally, electrical insulation of the busbar from assembly housing components can be generally achieved by disposing the ceramifiable pad on either the busbar or assembly housing component and then bringing together the busbar and assembly housing component such that the ceramifiable composition is disposed between them.

Although not explicitly shown here, it is further contemplated that the battery cells 514 might not be consolidated into battery modules 512. In such an embodiment, the battery cells 514 could be directly installed within the assembly housing provided by the battery case 510A and battery lid 510B.

Figure 6:
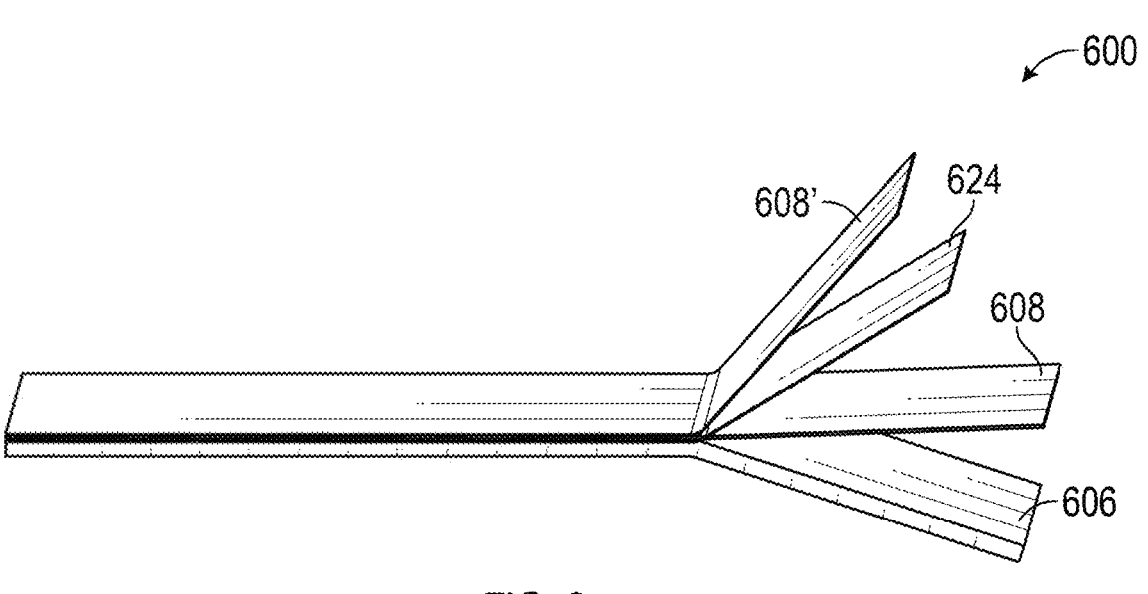
FIG. 6 is a perspective view showing layers of a multi-layered electrical insulator according to another embodiment.

FIG. 6 shows a multi-layered insulating article 600 that can be adhesively bonded to a busbar or other surface within a battery assembly. The bottom major surface of the article 600 is comprised of a ceramifiable pad 606, with a first adhesive layer 608 extending across and directly contacting the ceramifiable pad 606. Both are analogous to those layers of subassembly 100. A backing 624 extends across and directly contacts the first adhesive layer 608, and a second adhesive layer 608' extends across and directly contacts the backing 624.

The backing 624 enhances the structural integrity of the multilayered insulating article 600 and can facilitate handling by providing a non-friable layer that bonds strongly to the adhesive 608'. Advantageously, the article 600 can be transported and stored on a release liner (not shown in FIG. 6), from which it is released prior to use by gripping the backing 624 and peeling the article 600 away from the release liner. In this manner, the backing 624 can prevent delamination between the ceramifiable pad 606 and the first adhesive layer 608 upon liner release that would occur if the ceramifiable pad 606 and first adhesive layer 608 was directly bonded to the liner. The backing 624 can also be made from various materials including for example, glass fabric, ceramic fabric (e.g., basalt fabric), mica paper, ceramic paper, flame retardant, and high temperature polymer films or fabrics comprising, for example, oxidized polyacrylonitrile, aromatic polyamide, aromatic polyimide, polytetrafluoroethylene (PTFE), or polyphenylene sulfide (PPS).

Figure 7:
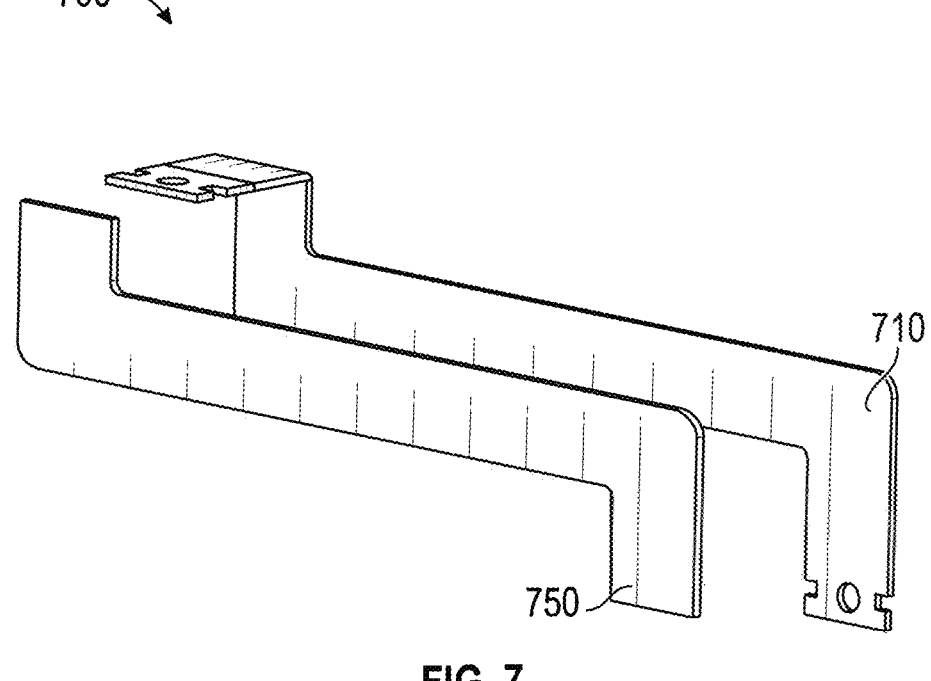
FIG. 7 is an exploded perspective view of a battery subassembly including the multi-layered electrical insulator of FIG. 6.

FIG. 7 shows a busbar assembly 700 where a busbar 710 extends along three dimensions.

An insulating article 750 having a shape generally matching that of the busbar 710 extends across a major surface of the busbar 710 to provide protection against shorting or current leakage along these overlapping regions. In a preferred embodiment, the insulating article 750 has a multilayered structure such as shown in the electrically insulating article 600 of FIG. 6, and can be formed into a customized shape by a die cutting process.

The ceramifiable pad comprises a ceramifiable composition that comprises a crosslinked silicone matrix retaining stabilizing components.

The ceramifiable pad typically has two opposed major surfaces and may have any suitable dimensions. Typically, it will be adapted to fit within the open available space within the assembly housing. In many embodiments, the ceramifiable pad has a substantially uniform (e.g., uniform) thickness. In other embodiments it may have a shaped profile (e.g., with ridges on one or both of opposed major surfaces). Other configurations are also permissible.

The term "silicone" refers to any of a diverse class of fluids, resins, or elastomers based on polymerized siloxanes, substances whose molecules contain chains of alternating silicon and oxygen atoms, wherein each silicon atom is further bonded to two additional groups. Examples of such groups may include H, alkyl (e.g., methyl or ethyl), halogenated alkyl, alkenyl (e.g., vinyl, allyl), phenyl, halogenated phenyl, alkoxy (e.g., methoxy or ethoxy), hydroxyl, acyloxy (e.g., acetoxy), and divalent crosslinking groups that connect two chains of alternating silicon and oxygen atoms. Of these, methyl is typically the predominant group.

The crosslinked silicone matrix may be formed by crosslinking a crosslinkable silicone composition. The crosslinkable silicone may be crosslinked by an appropriate crosslinking mechanism such as, for example, moisture curing, addition curing, peroxide curing, or high energy radiation (e.g., electron beam radiation or gamma radiation). In one embodiment, a two-part silicone curable silicone may be used such as, for example, a combination of a polyvinyl-substituted silicone with a polyhydrosilicone in the presence of a hydrosilylation catalyst (e.g., as in an RTV silicone). In another embodiment, the crosslinkable silicone may be a silicone having a plurality of free-radically polymerizable groups (e.g., vinyl, allyl, or acryloyl groups) in combination a thermally or photolytically activated free-radical initiator. In yet another embodiment, the crosslinkable silicone may be a silicone having a plurality of hydrolyzable groups that can form crosslinks in the presence of moisture or an acidic catalyst. Further details concerning such crosslinkable systems are well known in the art and are described, for example, by S. C. Shit et al. in "A Review on Silicone Rubber", *National Academy of Science Letters* (2013), 36(4), pages 355-365, the disclosure of which is incorporated herein by reference.

Many curable (i.e., crosslinkable) silicones (e.g., moisture-curable silicones, platinum-curable silicones, UV-curable silicones, peroxide-curable silicones) suitable for preparing the crosslinked silicone matrix are commercially available from suppliers such as, for example, Elkem Silicones, East Brunswick, New Jersey and Momentive Performance Materials, Waterford, New York.

In some preferred embodiments, the crosslinked silicone matrix is formed by exposing a silicone fluid (e.g., a polydimethylsiloxane fluid), optionally containing an MQ tackifying resin, to electron beam or gamma radiation. The silicone fluid may optional be functionalized with one or more groups as described hereinabove. Useful silicone fluids may have a number average molecular weight (Mn) of 3000 to 1000000 grams/mole, often 50000 to 500000 grams/mole or even 60000 to 300000 grams/mole, grams/mole, although higher and lower molecular weights may also be used.

Ceramifiable compositions according to the present disclosure may have any content (e.g., 1 to 50 weight percent, 5 to 50 weight percent, or even 10 to 50 weight percent) of the crosslinked silicone matrix that is capable of retaining the other components of the ceramifiable composition. In some embodiments, the crosslinked silicone matrix content may be less than 50 weight percent, less than 40 weight percent, less than 30 weight percent, less than weight 20 percent or even less than 10 percent, based on the total weight of the ceramifiable composition.

Appropriate conditions and procedures for e-beam crosslinking silicones is described, for example, in U.S. Pat. No. 9,359,529 (Liu et al.), the disclosure of which is incorporated herein by reference.

Appropriate conditions and procedures for gamma ray crosslinking of silicones are known and described, for example, by Palsule et al. in "Gamma Irradiation of Silicones", *Journal of Inorganic and Organometallic Polymers and Materials* (2008), 18, pages 207-221, the disclosure of which is incorporated herein by reference.

The crosslinked silicone matrix is typically continuous, however minor discontinuities (e.g., due to manufacturing irregularities) are permissible.

The stabilizing components comprise subcomponents a), b), and c).

Subcomponent a) comprises an aluminosilicate clay. Exemplary aluminosilicate clays include halloysite, illite, kaolinite, montmorillonite, pyrophyllite, mica, vermiculite, and combinations thereof. Exemplary micas include lepidolite, biotite, phlogopite, muscovite, and combinations thereof.

In some embodiments, subcomponent a) comprises from 45 to 70, 45 to 55, or 50 to 60 weight percent of a), b) and c) combined.

Subcomponent b) comprises at least one of phosphorus pentoxide, a polyphosphate, an inorganic phosphate salt, boron oxide, a hydrate thereof, a salt thereof, an organotitanate compound, or an organotin compound. Polyphosphates are salts or esters of polymeric oxyanions formed from tetrahedral $PO_4$ (phosphate) structural units linked together by shared oxygen atoms. Examples include monosodium diphosphate, disodium diphosphate, trisodium diphosphate, tetrasodium diphosphate, Graham's salt, Kurrol's salt, Maddrell's salt, sodium polyphosphate, potassium polyphosphate, sodium calcium polyphosphate, calcium polyphosphate, sodium hexametaphosphate, sodium metaphosphate, monosodium phosphate, disodium phosphate, and potassium phosphate. In typical embodiments, the polyphosphates are inorganic, although organic cations may be included if desired. Exemplary inorganic phosphate salts include alkali or alkaline earth metal phosphates such as sodium phosphate, potassium phosphate, lithium phosphate, cesium phosphate, magnesium phosphate, calcium phosphate, strontium phosphate, ammonium phosphate, and barium phosphate. Exemplary salts of boric acid include lithium borate, sodium borate, potassium borate, cesium borate, magnesium borate, calcium borate, ammonium borate, Exemplary hydrates of boric acid salts include sodium tetraborate decahydrate and sodium borate decahydrate (i.e., borax).

Exemplary organotitanate compounds include those available under the trade designation TYZOR from Dorf Ketal. Examples include titanium acetylacetonates (e.g., such as Tyzor AA-75, Tyzor GBA, Tyzor GBO, or Tyzor EHTAA), octylene glycol titanate available as Tyzor OGT, tetraisopropyl titanate (e.g., Tyzor TPT, reactive alkoxy titanates such as Tyzor 9000 and Tyzor BTM, Tyzot NPT, Tyzor TnBT, Tyzor ET, ad Tyzor TOT, and titanium chelates such as Tyzor CLA and Tyzor LA).

Exemplary organotin compounds include dialkyltin diesters (e.g., dioctyltin dilaurate), and stannoxanes, diorganotin oxides and diorganotin hydroxides and dimers and trimers thereof.

In some embodiments, subcomponent b) comprises from 5 to 40, 10 to 40, 20 to 40, 30 to 40, 5 to 30, 5 to 20, 5 to 15, 10 to 35, or 15 to 25 weight percent of subcomponents a), b) and c) combined.

Subcomponent c) comprises at least one of alumina or an at least partially hydrated form thereof, calcium oxide or an at least partially hydrated form thereof (e.g., monohydrocalcite or ikaite), calcium carbonate (e.g., calcite or aragonite), magnesium oxide or an at least partially hydrated form thereof (e.g., magnesium hydroxide), magnesium carbonate, or iron oxide or an at least partially hydrated form thereof.

Exemplary aluminum oxides (i.e., aluminas) include amorphous and crystalline aluminum oxides (e.g., η-, γ-, δ-, θ-, or α-alumina). Exemplary hydrates of aluminum oxide include boehmite (i.e., γ-AlO(OH)) and trihydroxyaluminum (also known as alumina hydrate).

Heating the ceramifiable composition to a temperature between 600 and 1600° C., inclusive, results in a ceramified pad as defined hereinabove. In some embodiments, the temperature is in a range of from 700 to 1600° C., 800 to 1600° C., 900 to 1600° C., or even 1000 to 1600° C. In other embodiments, the temperature is in a range of from 600 to 1500° C., 600 to 1400° C., 600 to 1300° C., or even 600 to 1200° C.

In some embodiments, subcomponents b) and c) melt at a temperature of 700 degrees or less, or even 600 degrees or less.

In many embodiments, subcomponents a), b), and c) collectively comprise 30 to 90 weight percent of the ceramifiable composition. In one embodiment, the subcomponents a), b), and c) taken collectively, and the crosslinkable silicone are present in the ceramifiable composition in a weight ratio of at least 70:30, at least 80:20, or even at least 90:10.

In some embodiments, subcomponent a) comprises from 45 to 70 weight percent, 45 to 55 weight percent, or 50 to 60 weight percent of a), b) and c) combined. In some embodiments, subcomponent b) comprises from 5 to 40 weight percent, 10 to 40 weight percent, 20 to 40 weight percent, 30 to 40 weight percent, 5 to 30 weight percent, 5 to 20 weight percent, 5 to 15 weight percent, 10 to 35 weight percent, or 15 to 25 weight percent of subcomponents a), b) and c) combined.

In some embodiments, subcomponent c) comprises from 10 to 40 weight percent, 10 to 30 weight percent, 10 to 20 weight percent, 20 to 30 weight percent, or 20 to 40 weight percent of subcomponents a), b) and c) combined.

In any case, the total of subcomponents a), b), and c) should add up to 100 weight percent, based solely on subcomponents a), b) and c).

If desired, ceramifiable compositions according to the present disclosure may include one or more fillers, preferably inorganic fillers, such as for example, glass fibers, ceramic fibers (e.g., basalt fibers), hollow glass microspheres, hollow ceramic microspheres, perlite, zeolite, and combinations thereof. Organic filler may be included, but due to their combustibility, their content is typically limited to less than 20 weight percent, less than 20 percent. Typical combined total amounts of the aforementioned fillers and stabilizing components range from 20 to 90 weight percent, 40 to 80 weight percent, or even 60 to 80 weight percent based on the total weight of the ceramifiable composition; however, other amounts may also be used.

If desired, ceramifiable compositions according to the present disclosure may have neutral acidity (basicity) by choosing balanced amount of acidic component b) and basic component c).

Preferably, the ceramifiable articles and compositions according to the present disclosure have a percent elongation at break according to ASTM test method D882-18 (2018) entitled "Standard Test Method for Tensile Properties of Thin Plastic Sheeting" of at least 30 percent.

Preferably, ceramified pads and compositions according to the present disclosure may contain less than or equal to 5 weight percent of (preferably less than or equal to 2 weight percent of, more preferably less than or equal to 1 weight percent of, or even free of) organic carbon.

Preferably, ceramified pads according to the present disclosure have a compressive strength according to ASTM test method C1424-15(2015) entitled "Standard Test Method for Monotonic Compressive Strength of Advanced Ceramics at Ambient Temperature" of at least 5 kilopascals.

Ceramifiable compositions and pads according to the present disclosure can be made by a multistep process in which a crosslinkable silicone is combined with other components (e.g., subcomponents a), b) and c) and optional filler) and blended/mixed by any suitable technique (e.g., by mechanical blending, by hand blending, or twin-screw extrusion mixing). At this point, the resultant mixture is often disposed as a layer (e.g., by extrusion) on a carrier (e.g., which may be temporary or permanently affixed) to facilitate handling during manufacture. If extruded, the mixture can be extruded through a slot or profile die, for example. Next, the crosslinkable silicone is crosslinked by an appropriate crosslinking mechanism such as, for example, addition curing, moisture curing, peroxide curing, or high energy radiation (e.g., electron beam radiation or gamma radiation). The carrier may be separated from the ceramifiable composition and/or ceramifiable composition at this or a later point, if desired.

Forming a layer (e.g., a ceramifiable pad) of the ceramifiable composition may be carried out by any suitable technique, such as, for example, by passing the ceramifiable composition through a roll gap, pressing, knife coating, bar coating and slot coating, preferably before crosslinking the crosslinkable silicone, although this is not a requirement.

In one preferred method, the ceramifiable composition is prepared by in-line extrusion of a mixture comprising the crosslinkable silicone, subcomponents a), b), and c), and optional fillers into a layer onto a carrier followed by exposure to electron beam (e-beam) radiation with sufficient dosage from one or both sides to crosslink (e.g., gel or cure) the crosslinkable silicone. Determination of suitable process conditions for sufficient mixing, sufficient coating coverage or penetration, and sufficient curing is within the capabilities of those skilled in the art.

In some embodiments, carrier comprises a releasable liner. Exemplary releasable liners include screens and meshes, polymer films and belts, all optionally treated with a release agent.

In some embodiments, the carrier comprises at least one of glass fabric, ceramic fabric (e.g., basalt fabric), mica paper, ceramic paper, flame retardant, and high temperature polymer films or fabrics comprising, for example, oxidized polyacrylonitrile, aromatic polyamide, aromatic polyimide, polytetrafluoroethylene (PTFE), or polyphenylene sulfide (PPS). The carrier may be used on one side or two sides of ceramifiable composition. Optionally, carriers maybe alternately layered with layers ceramifiable composition to make a multilayer construction of up to 21 layers. In some cases, solvent may be included to reduce viscosity of the mixture if coating it onto the carrier, however, solventless coating processes are preferred. Examples may include roll coating, gravure coating, knife coating, bar coating, spray coating, and slot coating. In some preferred embodiments, mixing is carried out in a heated extruder which then produces a film disposed onto a carrier, which then is subjected to a crosslinking treatment (e.g., heat, UV-radiation, electron beam, or gamma radiation) to form the ceramifiable composition. If using viscous curable silicones elevated temperatures in the extruder are often preferred (unless thermal crosslinking is being used).

When heated sufficiently (e.g., to a temperature in the range of 600 to 1500° C.) ceramifiable compositions and compositions according to the present disclosure form corresponding ceramified pads and compositions. Advantageously, ceramifiable compositions according to the present disclosure often substantially retain their shape when ceramified due to formation of ceramic crystals.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE 1

| MATERIAL | DESCRIPTION AND SOURCE |
|---|---|
| R8200 | Fumed silica, obtained as AEROSIL R8200 from Evonik, Essen, Germany |
| TS530 | Fumed silica, obtained as Cab-O-Sil TS530 from Cabot, Billerica, Massachusetts |
| Poly Microspheres | Polymer microspheres, obtained as product number E65-135D from Chase Corporation, Westwood, Massachusetts |
| 1,4-butanediol | Obtained as product number 493732 from Millipore Sigma, St. Louis, Missouri |
| Halloysite | Aluminosilicate clay mineral, obtained as DRAGONITE HP from Applied Minerals, Brooklyn, New York |
| KAMIN 70C | Calcined kaolin clay, obtained as KAMIN 70C from KaMin Performance Minerals, Macon, Georgia |
| Flat Mica | Mica obtained as SE MICA 200from CB Minerals |
| Vermiculite | Vermiculite obtained as screened particles at 0.3 to 0.8 mm from 3M CG |
| ADT 1002 | Expanded graphite, obtained as product number ADT 1002 from ADT Carbonic Materials, Shijiazhuang, China |
| ADT 35 | Expanded graphite, obtained as product number ADT 35 from ADT Carbonic Materials, Shijiazhuang, China |
| Glass Microspheres | Obtained as 3M Glass Bubbles K15 from 3M Company, St. Paul, Minnesota |
| MgO | Magnesium oxide, obtained as ZEROGEN 100SP from Huber Engineered Materials, Atlanta, Georgia |
| APHOS | A long-chain ammonium phosphate phase II, obtained as FR CROS 486 from Budenheim, Mansfield, Ohio |
| Exolit AP462 | Melamine encapsulated ammonium polyphosphate, obtained from Clariant, Muttenz, Switzerland |
| DOWSIL 3-8209 | Silicone foam kit part A, obtained as DOWSIL 3-8209 from Dow Chemical Company, Midland, Michigan |
| BLUESIL 3242 | RT silicone foam kit part A, obtained as BLUESIL 3242 from Elkem, Oslo, Norway |
| BLUESIL 3230 | RT silicone foam kit part A, obtained as BLUESIL 3230 from Elkem |
| DMS-S45 | Silanol terminated polydimethylsiloxane, obtained as DMS-S45 from Gelest, Morrisville, Pennsylvania |
| DMS-S51 | Silanol terminated polydimethylsiloxane, obtained as DMS-S51 from Gelest, Morrisville, Pennsylvania |
| OHX 4070 | Silanol terminated polydimethylsiloxane, obtained from Dow, Midland, Michigan |
| VS165K | Polydimethylsiloxane, obtained as ANDISIL VS 165000 from Andisil, Waukegan, Illinois |
| AK1000K | Trimethylsilyl terminated polydimethylsiloxane with a viscosity of approximately 1000000 cSt (1 $m^2$/second), obtained from Wacker Chemical Corporation, Adrian, Michigan |
| HMS993 | Polymethylhydrosiloxane obtained from Gelest, Morrisville, Pennsylvania |
| TMS803 | MQ tackifier resin obtained from Wacker Chemical Corporation, Adrian, Michigan |
| EM7934 | Silicone emulsion available as SYL-OFF EM 7934 |
| EM7975 | Catalyst component for SYL-OFF emulsion, platinum-catalyzed silicone release coatings. |
| Glass Fabric | 5 mil (25.4 microns) woven fiberglass fabric from JPS Composite Materials, Anderson, South Carolina |
| OPAN2 | Standard density (1.37 $g/cm^3$) oxidized polyacrylonitrile staple fibers, 1.7 dTex and 50 mm cut length available as OX from ZOLTEK (wholly owned subsidiary of Toray Group), St. Louis, Missouri |
| L1 | Release liner, polyester film containing a perfluorinated melt additive |

Test Methods

Fast Firing Test (FFT)

Test specimens were placed in a pre-heated furnace at certain temperature (e.g., 500~1000° C.) and maintained at that temperature for certain time period (2 to 20 minutes), as specified.

If the specimen caught fire a "yes" was recorded; if not, a "no" was recorded.

Percent Elongation at Break

Percent Elongation at Break was measured in % (percent elongation when break occurs) by in accordance with ASTM D882-18 (2018) entitled "Standard Test Method for Tensile Properties of Thin Plastic Sheeting". The test specimens were conditioned for 24 hours at 25° C. and 50% relative humidity. The test was performed using a Instron 6800 Peel tester (Instron 6800, from Norwood, Massachusetts). The crosslinked ceramifiable specimens used were 1 inch (2.54 cm) wide and 6 inches (15.2 cm) in length. The initial jaw separation of 4 inches and a crosshead speed of 12 inches/minute were used. The test specimens were stretched until breakage occurred.

Three samples were tested for each specimen and average percent elongation at break was reported.

Change in Linear Dimension after Fast Firing

The change in linear dimensions was determined by measuring the length of the specimen before firing and upon cooling after being subjected to the fast-firing conditions. An expansion of the specimen caused by firing was reported as a positive change in linear dimension and a contraction (shrinkage) as a negative change in linear dimension.

Compression Resistance

A cylindrical 500 g stainless steel weight with a 1 inch (2.54 cm) diameter contact surface (~5 kilopascals pressure) was gently placed onto a ceramified sample after fast firing test and cooled down to room temperature. If the specimen broke, a "fail" was recorded; if not, a "pass" was recorded.

Surface Tack

Tack was measured using a TA-XT Plus Texture Analyzer (Stable Micro Systems Ltd., Surrey, United Kingdom) equipped with a 6 mm diameter polypropylene cylinder probe. A cured ceramifiable test specimen was slit to a width of 1.9 cm (0.75 inches) and length of 10.2 cm (4.00 inches) and laminated to a brass bar with 10 millimeter diameter holes through it to allow for the probe to reach the surface of test specimen. Test parameters were: Pretest: 0.5 millimeters/second; test speed: 1.0 millimeters/second; post test speed: 10.0 millimeters/second; applied force: 100 grams; contact time: 5 seconds; trigger force: 1 gram; and withdraw distance: 3 millimeters. Tack was measured and reported in grams.

Amorphous Phase Percentage

Power XRD reflection geometry data were collected in the form of a survey scan by use of a PANalytical Empyrean vertical diffractometer, The instrument was calibration with NIST standard, SRM 660b. Line focus copper $K_\alpha$ radiation, and PIXcel 3D detector registry of the scattered radiation. The diffractometer was fitted with 0.04 rad Sollers, programmable divergence slit with 5.0 mm irradiation length, reflect-transmission stage, programmable receiving slit with 2.0 mm height, programmable anti-scatter slit with 2.0 mm observed length and nickel filter. The detector was set at 1D mode with 255 active channels (3.35°). The sample was ground before loaded to zero background silicon sample holder. The survey scan was conducted from 5 to 80 degrees using a 0.04 degree step size and 1200-second dwell time setting. The radius of measurement center is 240 mm. X-ray generator settings of 40 kV and 40 mA were employed. X-ray diffraction (XRD) peak intensity was evaluated by Profile fitting with Jada Pro. After loading the file, a background was defined. All the scattering peaks above the background were fit. The peaks with Full Width at Half Maximum (FWHM) larger than 4° (2 theta) were assigned to amorphous phase. The ratio of amorphous phase peak area divided by total peak area expressed as a percentage is reported as "amorphous phase percentage".

Elemental Analysis

Prior to data collection, a portion of each as-received sample was placed directly into a 31 mm pellet die set, the die set subsequently placed into an automatic hydraulic press, and each sample portion pressed into pellet form using a pressure of twenty tons per square inch (276 MPa) for a three minute duration. Each resulting pressed pellet was then placed directly into a stainless steel XRF sample holder and analyzed for most of the elements in the periodic table (from carbon to uranium inclusive) using a Rigaku Primus II wavelength dispersive X-ray fluorescence spectrometer equipped with a rhodium X-ray source, a vacuum atmosphere, and a 20 mm diameter measurement area. One aliquot was prepared from each as-received sample, each aliquot was analyzed three times, and an average and deviation was calculated and reported for each element detected.

Torch and Grit Test (T>)

Samples were nominally 102×102 mm in size. The sample was positioned 60 mm (2.375 inches) from the nozzle of a Champion Bench hydrogen torch burner obtained from Bethlehem Apparatus Company Inc, of Hellertown, Pennsylvania. A thermocouple (TC0) was positioned 25 mm (1.0 inches) from the nozzle of the burner. A blaster gun was loaded with 120 grit aluminum oxide non-shaped media and aligned with the nozzle of the torch at the same distance (60 mm) from the sample. The torch of the Champion Bench Burner was adjusted to 1200° C. The media blaster gun was then triggered at 241.3 kPa (35 psi). A sample was exposed to a maximum of 12 blast cycles each lasting 20 seconds with 10 seconds of active blast time and 10 seconds of inactive blast time in the center of the sample. Sample testing was stopped if a hole was burned through the test specimen to the opposite side, or if mounted on an aluminum plate, if a hole was blasted through to the aluminum. The Torch and Grit Test used in these experiments is a modified version of the Torch and Grit Test described in WO 2021/144758 A1 and incorporated herein by reference.

Comparative Example CE-1

DMS-S51 (100 grams (g)) was coated between two L1 liners using a knife coater having a 20 mil (0.51 mm) gap and cured by e-beam radiation with 300 kiloelectron volts (keV) and 8 megarads (Mrad) from both sides.

Comparative Example CE-2

BLUESIL 3230 (100 g) was coated between two L1 liners using a knife coater having a 20 mil (0.51 mm) gap and cured by e-beam radiation with 300 keV and 8 Mrad from both sides.

Comparative Example CE-3

OHX4070 (69 g), 31 g of TMS803, and 2 g of HMS993 was mixed together using a high speed mixer. The mixture was coated between two L1 liners using a knife coater having a 40 mil (1.02 mm) gap and cured by e-beam radiation with 300 keV and 12 Mrad from both sides.

Comparative Example CE-4

OPAN2 having a basis weight of 100 grams per square centimeter (gsm) was used as received.

Example EX-1

DMS-S51(100 g), 50 g of Halloysite, 25 g of MgO, and 25 g of APHOS were mixed together using a high speed mixer. The mixture was coated between two L1 liners using a knife coater having a 20 mil (0.51) gap and cured by e-beam radiation with 300 keV and 15 Mrad from both sides.

Example EX-2

BLUESIL 3230 (100 g), 4 g of glass microspheres, 2 g of 1,4-butanediol, 50 g of halloysite, 25 g of MgO, and 25 g of APHOS were mixed together using a high speed mixer. The mixture was heated and coated at 70° C. between two L1 liners with a 20 mil (0.51 mm) gap through a knife coater and cured by e-beam radiation with 300 keV and 15 Mrad from both sides.

Example EX-3

DOWSIL (100 g), 4 g of glass microspheres, 2 g of 1,4-butanediol, 50 g of halloysite, 25 g of MgO, and 25 g of APHOS were mixed together using a high speed mixer. The mixture was coated at 93° C. with a 20 mil (0.51 mm) gap between two L1 liners through a knife coater and cured by electron beam (e-beam) radiation using 300 keV and 6 Mrad from both sides.

Example EX-4

BLUESIL 3242 (100 g), 4 g of glass microspheres, 2 g of 1,4-butanediol, 50 g of halloysite, 25 g of MgO, and 25 g of APHOS were mixed by high speed mixer. The mixture was heated and coated at 70° C. between two L1 liners with a 20 mil (0.51 mm) gap through a knife coater and cured by e-beam radiation with 300 keV and 15 Mrad from both sides.

Example EX-5

DMS-S45 (80 g), 80 g of halloysite, 20 g of MgO, and 20 g of APHOS were mixed by high speed mixer. The mixture was hot pressed at 93° C. between two pieces of 5 mil (0.13 mm) glass fabric with a 46 mil (1.17 mm) gap through a knife coater and cured by e-beam radiation with 300 keV and 16 Mrad from both sides.

Example EX-6

DMS-S45 (80 g), 80 g of KAMIN 70 C, 20 g of MgO, and 20 g of APHOS were mixed by high speed mixer. The mixture was hot pressed at 93° C. between two pieces of 5 mil (0.13 mm) glass fabric with a 46 mil (1.17 mm) gap through a knife coater, and cured by e-beam radiation with 300 keV and 16 Mrad from both sides.

Example Ex-7

DMS-S45 (80 g), 80 g of KAMIN 70 C, 20 g of MgO, and 20 g of APHOS were mixed by high speed mixer. The mixture was hot pressed at 93° C. between two pieces of 5 mil (0.13 mm) glass fabric with a 13 mil (0.33 mm) gap making a 3-layer construction. A second 3-layer construction was made, and additional mixture was hot pressed between the two 3-layer constructions with a 46 mil (1.17 mm) gap, making a 7-layer construction. The 7-layer construction was cured by e-beam radiation with 300 keV and 8 Mrad from both sides.

Example EX-8

AK1000K (32 g), 16 g of halloysite, 16 g of MgO, and 16 g of APHOS were mixed by Brabender mixer (C.W. Brabender Instruments, Inc., South Hackensack, New Jersey) at 93° C. The mixture was hot pressed at 93° C. between two pieces of 5 mil (0.13 mm) glass fabric with 46 mil (1.17 mm) gap, and cured by e-beam radiation with 300 keV and 8 Mrad from both sides.

Example EX-9

AK1000K (21 g), 21 g of halloysite, 14 g of MgO, and 14 g of APHOS were mixed using a Brabender mixer at 93° C. The mixture was hot pressed at 93° C. between two pieces of 5 mil (0.13 mm) glass fabric with 46 mil (1.17 mm) gap, and cured by e-beam radiation with 300 keV and 8 Mrad from both sides.

Example EX-10

AK1000K (14 g), 28 g of halloysite, 14 g of MgO, and 14 g of APHOS were mixed using a Brabender mixer at 93° C.

The mixture was hot pressed at 93° C. between two pieces of 5 mil (0.13 mm) glass fabric with 46 mil (1.17 mm) gap, and cured by e-beam radiation with 300 keV and 8 Mrad from both sides.

Example EX-11

AK1000K (20 g), 8 g of halloysite, 10 g of MgO, 10 g of APHOS, and 2 g of glass microspheres were mixed by Brabender mixer at 93° C. The mixture was hot pressed at 93° C. between two pieces of 5 mil (0.13 mm) glass fabric with a 46 mil (1.17 mm) overall thickness and cured by e-beam radiation with 300 keV and 8 Mrad from both sides.

Example EX-12

AK1000K (21 g), 21 g of flat mica, 14 g of MgO, and 14 g of APHOS were mixed by Brabender mixer at 93° C. The mixture was hot pressed at 93° C. between two pieces of 5 mil glass fabric with a 56 mil (1.42 mm) overall thickness and cured by e-beam radiation with 300 keV and 8 Mrad from both sides.

Example EX-13

AK1000K (21 g), 21 g of vermiculite, 14 g of MgO, and 14 g of APHOS were mixed by Brabender mixer at 93° C. The mixture was hot pressed at 93° C. between two pieces of 5 mil (0.13 mm) glass fabric with 56 mil (1.42 mm) overall thickness, and cured by e-beam radiation with 300 keV and 8 Mrad from both sides.

Example EX-14

AK1000K (21 g), 21 g of vermiculite, 14 g of MgO, 14 g of APHOS, and 2 g of glass microspheres were mixed by Brabender mixer at 93° C. The mixture was hot pressed at 93° C. between two pieces of 5 mil (0.13 mm) glass fabric with a 56 mil (1.42 mm) overall thickness and cured by e-beam radiation with 300 keV and 8 Mrad from both sides.

Example EX-15

VS165K (77 g), 14 g of R8200, 1 g of poly microspheres, 8 g of expanded graphite (4 g of ADT 1002 and 4 g of ADT 35), 4 g of glass microspheres, 2 g of 1,4-butanediol, 50 g of halloysite, 25 g of MgO, and 25 g of AP462 were mixed by high speed mixer. The mixture was hot pressed at 93° C. with a 30 mil (0.76 mm) overall thickness between two L1 liners and cured by e-beam radiation with 300 keV and 6 Mrad from both sides.

Example EX-16

DMS-S45 (100 g), 50 g of halloysite, 50 g of MgO, 5 g of HMS993, and 10 g of TS 530 were mixed by high speed mixer. The mixture was coated between two L1 liners using a knife coater having a 30 mil (0.76 mm) gap and cured by e-beam radiation with 300 keV and 8 Mrad from both sides.

Example EX-17

A twin-screw extruder was operated at 212° F. (100° C.) and 700 revolutions per minute (rpm), fed with AK1000K at a rate of 10 lb/hr (4.5 kg/hr), and halloysite at 7 lb/hr (3.2 kg/hr), and coated at 10 ft/min (3.0 m/min) between two pieces of 5 mil (0.13 mm) glass fabric with a 35 mils (0.89 mm) overall thickness, and cured in-line by e-beam radiation with 300 keV and 30 Mrad from both sides.

Example EX-18

Twin-screw extruder was operated at 212 F and 700 RPM, fed with AK1000K at 10 lb/hr (kg/hr), and Kamin 70 C at 7 lb/hr (3.2 kg/hr), and extruded at 10 ft/min (3.0 m/min) between two pieces of 5 mil (0.13 mm) glass fabric with 12 mils (0.30 mm) overall thickness, and cured inline by e-beam radiation with 300 keV and 35 Mrad from both sides. Collected two rolls of the three layer constructions. Repeat the procedure, extruded another layer of compounded silicones between 2 layers of three layer coated webs, cured inline by e-beam radiation with 300 keV and 35 Mrad from both sides, and collected a 7 layer (GF/Si/GF/Si/GF/Si/GF) coated web.

Example EX-19

Sample webs were produced as described in Comparative Example CE-4. A coating solution containing 23 weight percent of Syl-off 7934 (46 g) and 2 weight percent of EM7975 (4 g) and 75 weight percent of water (150 g) was prepared, this silicone dispersion was mixed with a suspension of 50 g of HNTs (Dragonite HP-A) in 100 mL of water (14.3 weight percent). The coating formulation was spray coated onto the web using a PPS system (3M Paint Preparation System, 3M Company). The samples were hung for 2 hours inside a hood to dry and then cured at 80° C. for 20 minutes, after this process, it was cured at 175° C. for 40 minutes. Final material showed a final weight of 205 gsm coating (305 gsm total).

Example EX-20

Sample webs were produced as described in Comparative Example 4 (CE4). A coating solution containing 23 weight percent of Syl-off 7934 Emulsion coating (46 g) and 2 weight percent of EM7975 (4 g) and 75 weight percent of water (150 g) was prepared, this silicone dispersion was mixed with a suspension of 85 g of Dragonite HP-A in 100 mL of water. The coating formulation was spray coated onto the web using a PPS System. The samples were hung for 2 hours inside a hood to dry and then cured at 80° C. for 20 minutes, after this process, it was cured at high temperature 175° C. for 40 minutes. Final material showed a final weight of 252 gsm coating (352 gsm total product).

Table 2, below, reports various test results for Comparative Examples CE-1 to CE-6 and Table 3 for Examples EX-1 to EX-6.

TABLE 2

| | TEST | CE-1 | CE-2 | CE-3 |
|---|---|---|---|---|
| TEST OF CERAMIFIABLE COMPOSITION | Surface Tack | no | slightly | slightly |
| | Percent Elongation at break | >50% | >50% | >50% |
| | Flexibility | excellent | excellent | excellent |
| TEST AFTER FAST FIRING (FFC) | FFT | Yes (2 min @ 500° C.) | Yes (3 min @ 600° C.) | Yes (3 min @ 600° C.) |
| | % Change in Linear Dimensions | ashes (2 min @ 500° C.) | ashes (3 min @ 600° C.) | ashes (3 min @ 500° C.) |
| | Compression Resistance | failed (2 min @ 500° C.) | failed (3 min @ 600° C.) | failed (3 min @ 600° C.) |
| | % Residual Mass | 24 (2 min @ 500° C.) | 37 (3 min @ 600° C.) | 47 (3 min @ 600° C.) |
| | % Atomic Composition | — | C(2)/O(50)/Si(48) | — |
| | Amorphous Phase Percentage | — | 100 | 38 |
| | TGT | — | — | — |

TABLE 3

| | TEST | EX-1 | EX-2 | EX-3 | EX-4 | EX-5 | EX-6 |
|---|---|---|---|---|---|---|---|
| TEST OF CERAMIFIABLE COMPOSITION | Surface Tack | no | no | no | no | — | — |
| | Percent Elongation at Break | >100% | >75% | >75% | >75% | — | — |
| | Flexibility | excellent | excellent | excellent | excellent | good | good |
| TEST AFTER FAST FIRING (FFC) | FFT | No (5 min @ 600° C.) | No (15 min @ 800° C.) | No (15 min @ 900° C.) | No (15 min @ 800° C.) | — | — |
| | % Change in Linear Dimensions | −2 (5 min @ 600° C.) | −5 (15 min @ 100° C.) | −4 (15 min @ 100° C.) | −7 (15 min @ 1000° C.) | — | — |
| | Compression Resistance | pass (5 min @ 600° C.) | pass (15 min @ 1000° C.) | pass (15 min @ 1000° C.) | pass (15 min @ 1000° C.) | — | — |
| | % Residual Mass | 54 (5 min @ 600° C.) | 53 (15 min @ 1000° C.) | 55 (15 min @ 1000° C.) | 50 (15 min @ 1000° C.) | — | — |
| | % Atomic Composition | — | C(2)/O(48)/Si(22)/Mg(12)/Al(8)/P(8) | C(1)/O(48)/Si(20)/Mg(14)/Al(7)/Ca(2)/P(8) | C(2)/O(48)/Si(22)/Mg(11)/Al(8)/Ca(1)/P(8) | — | — |
| | Amorphous Phase Percentage | — | 40 | 28 | 34 | — | — |
| | TGT | — | — | — | — | 3 | 3 |

19

All cited references, patents, and patent applications in this application that are incorporated by reference, are incorporated in a consistent manner. In the event of inconsistencies or contradictions between portions of the incorporated references and this application, the information in this application shall control.

The preceding description, given in order to enable one of ordinary skill in the art to practice the claimed disclosure, is not to be construed as limiting the scope of the disclosure, which is defined by the claims and all equivalents thereto.

What is claimed is:

1. A battery assembly comprising:

an assembly housing;

a plurality of battery modules disposed within the assembly housing and electrically coupled to a busbar wherein each battery module respectively comprises a plurality of individual cells disposed within a module housing; and at least one ceramifiable pad disposed within the assembly housing and disposed between at least one of:

at least two of the individual cells, at least two of the battery modules, the busbar and the assembly housing, or at least one of the battery modules and the assembly housing, wherein the ceramifiable pad comprises a ceramifiable composition comprising a crosslinked silicone matrix comprising stabilizing components, wherein the stabilizing components comprise subcomponents:

a) at least one of an aluminosilicate clay;

b) at least one of phosphorus pentoxide, a polyphosphate, an inorganic phosphate salt, boron oxide, a hydrate thereof, a salt thereof, an organotitanate compound, or an organotin compound; and c) comprises at least one of alumina or an at least partially hydrated form thereof, calcium oxide or an at least partially hydrated form thereof, calcium carbonate, magnesium oxide or an at least partially hydrated form thereof, magnesium carbonate, or iron oxide or an at least partially hydrated form thereof;

and wherein heating the ceramifiable composition to a temperature between 60° and 1600° C. inclusive, results in a ceramified composition.

2. The battery assembly of claim 1, wherein the ceramifiable composition comprises less than 50 percent by weight of the silicone matrix, and wherein the ceramified composition comprises at least 50 percent of ceramic crystalline phase.

3. The battery assembly of claim 1, wherein subcomponents b) and c) melt at a temperature of 600 degrees or less.

4. The battery assembly of claim 1, wherein subcomponents a), b), and c) collectively comprise 30 to 80 percent of the ceramifiable composition.

5. The battery assembly of claim 1, wherein subcomponent a) comprises from 45 to 60 weight percent of a), b), and c) combined.

6. The battery assembly of claim 1, wherein subcomponent b) comprises from 5 to 40 weight percent of subcomponents a), b), and c) combined.

7. The battery assembly of claim 1, wherein subcomponent c) comprises from 5 to 40 weight percent of subcomponents a), b), and c) combined.

8. The battery assembly of claim 1, wherein subcomponent a) comprises halloysite.

9. The battery assembly of claim 1, wherein subcomponent b) comprises at least one of phosphorus pentoxide, a polyphosphate, or an inorganic phosphate salt.

10. The battery assembly of claim 1, wherein subcomponent b) comprises phosphorus pentoxide.

11. The battery assembly of claim 1, wherein subcomponent c) comprises magnesium oxide or magnesium hydroxide.

12. The battery assembly of claim 1, wherein subcomponent c) comprises magnesium hydroxide.

13. The battery assembly of claim 1, wherein the ceramifiable composition further comprises at least one of hollow glass microsphere or hollow ceramic microspheres.

14. The battery assembly of claim 1, wherein the crosslinked silicone matrix is crosslinked at least in part by exposure to high energy radiation.

15. The battery assembly of claim 14, wherein the high energy radiation is electron beam radiation.

16. The battery assembly of claim 1, wherein the ceramified composition contains less than or equal to 5 weight percent of organic carbon.

17. The battery assembly of claim 1, wherein the ceramifiable pad comprises first and second opposed major surfaces, further comprising an adhesive layer disposed on the first major surface.

18. The battery assembly of claim 17, wherein the adhesive layer comprises a silicone-based pressure-sensitive adhesive.

19. The battery assembly of claim 1, wherein the ceramifiable composition has a percent elongation at break according to ASTM test method D638-14 (2015) of at least 30 percent and/or the ceramified composition has a compressive strength according to ASTM test method C1424-15 (2015) of at least 5 kilopascals.

* * * * *